United States Patent [19]
Glossop

[11] Patent Number: 5,834,759
[45] Date of Patent: Nov. 10, 1998

[54] TRACKING DEVICE HAVING EMITTER GROUPS WITH DIFFERENT EMITTING DIRECTIONS

[76] Inventor: Neil David Glossop, 3000 Bissonnet, Suite 4201, Houston, Tex. 77005

[21] Appl. No.: 861,597

[22] Filed: May 22, 1997

[51] Int. Cl.$^6$ ..................................................... G01J 1/20
[52] U.S. Cl. ................................... 250/203.1; 250/206.1; 250/578.1; 128/665
[58] Field of Search ............................. 250/203.1, 203.2, 250/206.1, 206.2, 578.1; 356/375; 244/3.16–3.18; 128/665, 664; 362/18, 11, 71

[56] References Cited

U.S. PATENT DOCUMENTS 5,345,087   9/1994   Luber et al. .......................... 250/203.2

OTHER PUBLICATIONS

Beute, G.N., et al. "Case Study of the Use of the Easy Guide Neuro Image–Guided Surgery Prototype System Resection of a Pineal Region Meningioma", Philips Medical Systems.
Northern Digital Inc. Brochure Entitled "NDI's Portable Optical Localizer", published 1996.
"BrainLAB VectorVision" Brochure published by BrainLAB GmbH.
"Stealth Station Image Guided Surgery System" Brochure published by Sofamor Danek in 1996.
Medivision advanced Support Systems Brochure Entitled "Reach Your Target . . ." published by Medivision in Aug., 1996.
Aesculap Brochure Entitled "SPOCS Surgical Planning and Orientation Computer System".
Elekta Brochure Entitled "The Freehand Viewing Wand" published in Jun., 1996.
Philips Brochure Entitled "EasyGuide Neuro Image Guided Surgery System" published in 1995.
Ziess Brochure Entitled "SMN Stereotactic System" published in 1996.

*Primary Examiner*—Que Le

[57] ABSTRACT

A tracking device for use in an optical tracking system is disclosed. The tracking device has a plurality of faces, each face having at least three markers which can be tracked by the optical tracking system. The markers may be infrared emitting diodes. The tracking system can individually activate the markers on each of the faces and select the markers which can be most accurately tracked by the tracking system. Portions of the faces are adjacent to one another to form clusters of emitters. The clusters of emitters are separated by at least a predetermined distance corresponding to the tolerance of the optical tracking system. The field of view of the tracking device approximates a section of a sphere centered at the device.

20 Claims, 8 Drawing Sheets

TRACKING DEVICE HAVING EMITTER GROUPS WITH DIFFERENT EMITTING DIRECTIONS

FIELD OF THE INVENTION

This invention relates to tracking devices for use in tracking systems that track the position and orientation of objects. More particularly, the present invention relates to tracking devices for use in optical tracking systems.

BACKGROUND OF THE INVENTION

Tracking systems have been used in the past to track the position and, if desired, the orientation of objects in space. Tracking systems have been used in several applications, such as robotics, industrial design, reverse engineering and motion analysis. In addition, tracking systems have been used in Image Guided Surgery to track the position and orientation of surgical instruments, such as probes, biopsy devices, endoscopes and drills, in order to display a representation of the surgical instruments on pre-acquired images of the patient.

In the past, there have been many different types of tracking devices for use in optical tracking systems. Generally, optical tracking systems track the position and orientation of an object by rigidly fixing a tracking device to the object and then optically sensing the position and orientation of the tracking device in space. After the object and tracking device have been calibrated, the position and orientation of the object can be determined from the sensed position and orientation of the tracking device. The position and orientation of the tracking device can comprise three positional coordinates, x, y and z and three orientation coordinates, namely pitch, yaw and roll, in a frame of reference.

In optical tracking systems, cameras are used to optically sense the position of markers on the tracking device. In general, the optical tracking system must have at least three 1-dimensional cameras or two 2-dimensional cameras to determine the position of the markers and thereby track the three dimensional position and orientation of the tracking device. A 2-dimensional camera includes a conventional video camera having several photo detectors arranged in a square pattern. A 1-dimensional camera includes those in which a number of photodetectors are arranged in a line. Whether three 1-dimensional cameras or two 2-dimensional cameras are used, all of the cameras must be able to simultaneously sense the same marker at the same time to determine its position in space.

With the positional information of at least three markers, the optical tracking system has sufficient information to determine the position and orientation of a tracking device. This information can be used to determine the position and orientation of the object fixed to the tracking device after the object and tracking device have been properly calibrated. In the event only two markers can be tracked, the cameras can determine the x, y, z positional coordinates and two orientation coordinates, usually pitch and yaw.

The cameras can sense radiation from the markers on the tracking device. Two types of markers are generally used, namely active markers and passive markers. Passive markers are essentially reflective devices which reflect light shined onto the passive markers from a distant light source, usually located near the cameras. Active markers can be any type of emitter which emits radiation that can be sensed by the two cameras.

In tracking systems using passive markers, typically retroreflective markers are attached to the tracking device. One difficulty with passive optical systems is that all of the markers continually reflect light from the same light source. In other words, passive markers are continually "lit". As such, if three markers are being tracked, it is difficult for the cameras to determine which markers are being viewed. This is especially problematic if one or more of the markers becomes obscured, as occasionally happens. The tracking system must then determine which markers are still being viewed and tracked and which markers have been obscured.

In tracking systems using active markers, the emitters can be "strobed" by the system. When an active system strobes the emitters, it individually activates one known emitter at a particular time, and thereby can determine which emitter is being viewed. In this way, the optical tracking systems utilizing active markers can determine which markers are active, and therefore which markers are being tracked. In addition, if the two cameras cannot sense a marker which the system has activated, then the tracking system knows that the marker is obscured. Generally, active systems are more useful and powerful than passive systems, but active systems are also more complex and therefore suffer from a time lag in tracking the object while the emitters are strobed and are more costly.

A further disadvantage with the optical tracking systems utilizing active markers is that the emitters used as active markers are only accurate within a "cone of accurate emission", which is generally a cone having its apex at the emitter. Slightly past this cone of accurate emission, the emitters can be seen but cannot be tracked accurately by the cameras because the emitters do not behave as a point source of light. As the angle increases further past the cone of accurate emission, the emitters eventually become invisible due to the extreme angle. Therefore, emitters used as active markers are only accurate within a specified cone of accurate emission, and are completely invisible at extreme angles.

Also, optical tracking systems usually have an inherent tolerance in that the markers must be more than a predetermined distance apart for the cameras to be able to differentiate between two markers. In addition, markers that are spaced close together do not make use of the dynamic range of the sensors, and it will be impossible to accurately determine the position and orientation of the tracking device. Therefore, the markers must be spaced on the tracking device more than this predetermined distance. However, at the same time, the tracking device cannot be so large as to make it unwieldy. Prior arrangements of markers designed to maintain good visibility over a large field of view suffer either from accuracy problems due to close spacing of markers, or tend to be large three dimensional shapes that occupy a volume that is not conducive to surgical or other procedures.

A further disadvantage of the prior art tracking systems is that even if the markers are separated on the tracking device more than the tolerance, at extreme angles, as the device is moved, two markers may move near each other in a line at an oblique angle to the cameras. At these extreme angles, the two markers tend to appear to the cameras as a single marker. When this happens, the markers are said to "coalesce" and the system cannot track the device.

SUMMARY OF THE INVENTION

Accordingly, it is an object of this invention to at least partially overcome the disadvantages of the prior art. Also, it is an object of this invention to provide an improved type of tracking device for use in optical tracking systems. Also, it is an object of this invention to provide a tracking device which has a large visible range in which the emitters are accurate.

Accordingly, in one of its objects, this invention resides in a tracking device for use in an optical tracking system to track a position and orientation of an object, said tracking device comprising: a tracker housing having a first side and a second side, and comprising means for rigidly fixing the device to the object; a first face on the first side of said device, said first face comprising a first group of at least three emitters, the first group of emitters operable to emit radiation substantially in a first direction directed away from the first side; and a second face on the first side of said device, said second face comprising a second group of at least three emitters, the second group of emitters operable to emit radiation in a second direction directed away from the first side; and wherein the second direction is different from the first direction.

In a further aspect, the present invention resides in an optical tracking system to track a position and orientation of an object, a tracking device comprising: a tracker housing having a first side and a second side, and comprising means for rigidly fixing the device to the object; a first face comprising at least three face portions; a first group of at least three emitters, each emitter in the first group located on a corresponding portion of the first face, the first group of emitters operable to emit radiation substantially in a first direction directed away from the first side; a second face comprising at least three face portions; a second group of at least three emitters, each emitter in the second group located on a corresponding portion of the second face, the second group of emitters operable to emit radiation substantially in a second direction away from the first side and different from the first direction; and wherein each portion of the first face is adjacent a corresponding portion of the second face.

In a still further aspect, the present invention resides in an optical tracking system to track a position and orientation of an object, a tracking device comprising: a tracker housing comprising means for rigidly fixing the tracking device to the object; at least two groups of emitters, each group of emitters having at least three emitters emitting radiation in the same direction, and, each group of emitters emitting radiation in different directions; wherein the optical tracking system can track the position and orientation of the object by tracking any group of emitters; and wherein the emitters are arranged on the housing in at least three clusters, each cluster comprising one emitter from each of the groups.

Accordingly, the present invention provides a tracking device with a large visible range in which the emitters are accurate so that the tracking device can be tracked by the optical tracking system. This is advantageous in that the operator need not be concerned during manipulation of the object that the optical tracking system will "lose sight of" the emitters and thereby not be able to accurately track the object. This is particularly important in the medical field, such as in image guided surgery, where the surgeon must be able to manipulate the object, usually a probe, during a surgical procedure without fear that the optical tracking system will not be able to accurately track the probe. Clearly, a large visible range in which the optical tracking system can accurately sense the position of markers on a tracking device is desirable so that the surgeon can focus on the surgical procedure.

A further advantage of the present invention is that it provides a tracking device with the markers from different groups placed closely together in clusters. This minimizes the size of the tracking device by efficiently orienting the emitters on the tracking device, but does not jeopardize accuracy because the emitters from each group are separated by a predetermined distance. This also decreases the likelihood that the emitters will coalesce. A further advantage is that it is capable of providing uniformly good accuracy over a large visible field of view while staying compact and roughly two dimensional in shape.

A still further advantage of the present invention is that if emitters from one group begin to coalesce, are obscured by an object, or are no longer accurate, the system can start tracking the device with the emitters from another group. This is especially useful when the cones of emissions from two groups overlap, thereby creating a redundancy in a particular volume.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
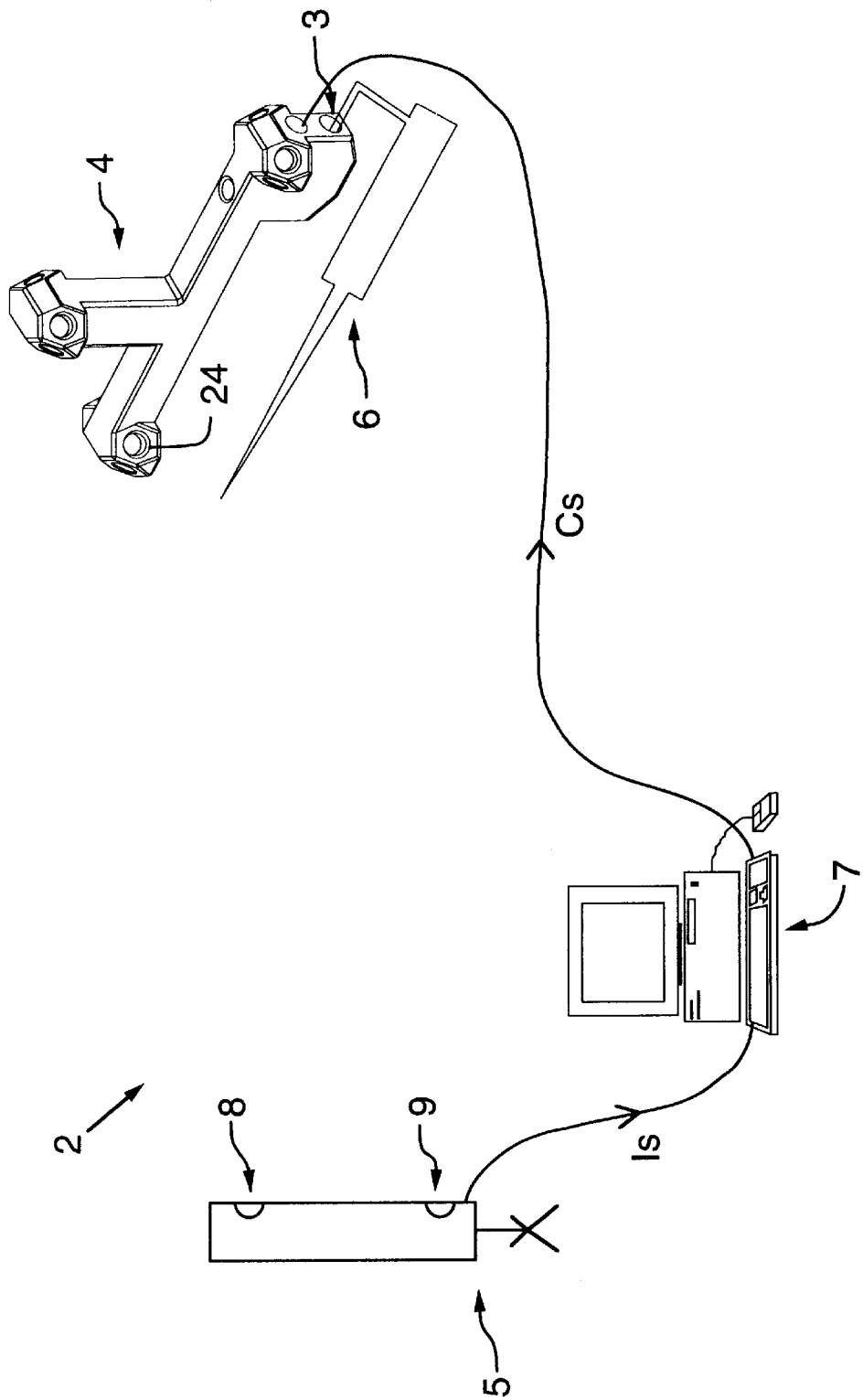
FIG. 1 shows a symbolic representation of an optical tracking system comprising a tracking device according to one embodiment of the present invention.

FIG. 1 shows a symbolic representation of an optical tracking system, shown generally as reference numeral 2. The optical tracking system 2 comprises a computer 7 and two cameras 8 and 9. The optical tracking system 2 tracks the position and orientation of the object 6 by sensing the position and orientation of the tracking device 4.

The object 6 is rigidly fixed to a tracking device 4 by means of the mounting hole 3. The tracking device 4 is controlled by control signal $C_S$. The computer 7 sends the control signal $C_S$ to the tracking device 4 to selectively activate different emitters (one of which is shown in FIG. 1 by reference numeral 24) on the tracking device 4.

The cameras 8, 9 send information signals $I_S$ to the computer 7 corresponding to the sensed radiation. With the information signals $I_S$, and knowing which emitters have been activated, the computer 7 can determine the position and orientation of the tracking device 4. If the object 6 and the tracking device 4 have been properly calibrated, the computer 7 can determine the position and orientation of the tracking device 4 and then determine the position and orientation of the object 6. Further, with prior knowledge of the geometry of the tracking device 4 and emitter placement therein, the computer 7 can select the most appropriate emitters to use in the calculation of the position and orientation of the tracking device 4.

Figure 2:
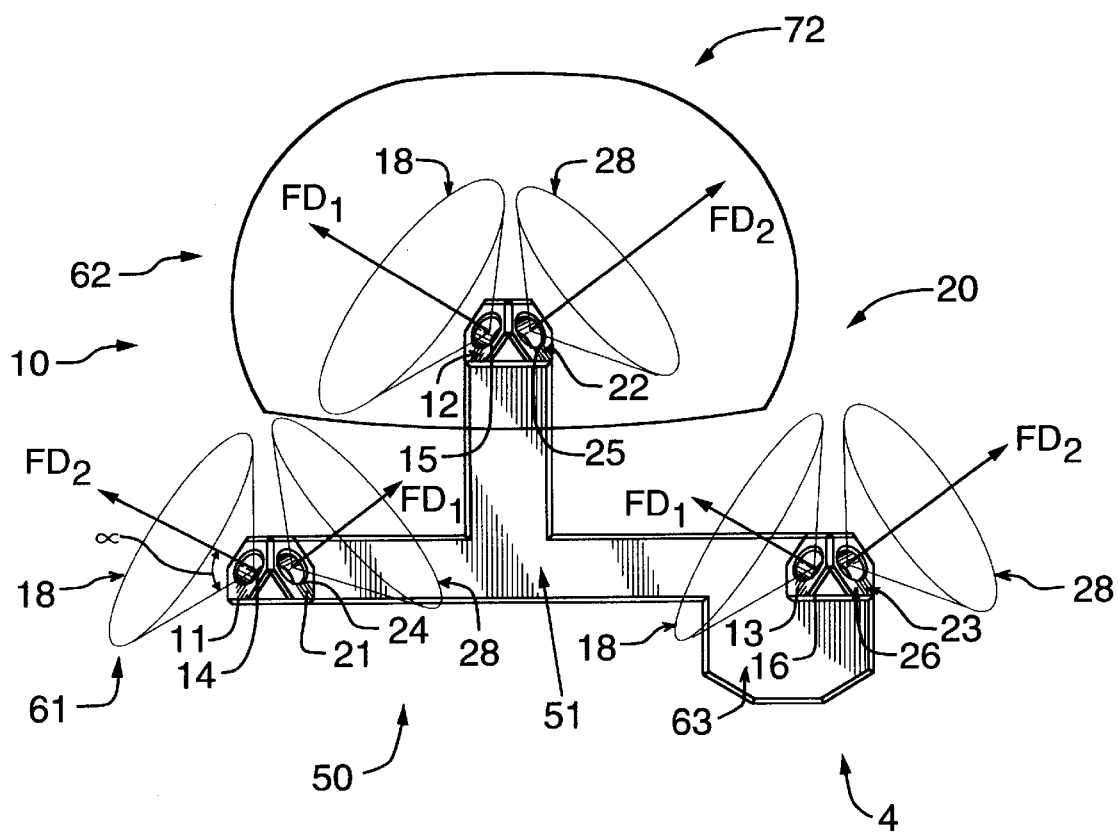
FIG. 2 shows a view of a first side of the tracking device according to one embodiment of the present invention.

FIG. 2 shows a side view of a first side 51 of the tracking device 4 according to one embodiment of the present invention. As shown in FIG. 2, the tracking device 4 comprises a first face, shown generally in FIG. 2 by reference numeral 10, and a second face, shown generally in FIG. 2 by reference numeral 20. The first face 10 comprises a first group of at least three emitters 14, 15, 16, which are operable to emit radiation substantially in a first direction $F_{D1}$ directed away from the first side 51 of the tracking device 4. Accordingly, the first face 10 comprises at least the minimum number of emitters, in this case three, that the optical tracking system 2 requires to track the tracking device 4. In the same way, the second face 20 comprises at least the minimum number of emitters, in this case three, that the optical tracking system 2 requires to track the tracking device 4. The second group of emitters 24, 25, 26 are operable to emit radiation substantially in a second direction $F_{D2}$ directed away from the first side 51 and different from the first direction $F_{D1}$.

The first group of emitters 14, 15, 16 each emit radiation within a corresponding first cone of accurate emission 18. As the emitters 14, 15, 16 in the first group will typically be the same, the cone 18 will be identical for each emitter 14, 15, 16 but this need not be the case. The first cone 18 generally has an angle α with the first direction $F_{D1}$ of emission. In a preferred embodiment, the angle α is 60°. Similarly, the second group of emitters 24, 25, 26 each emit radiation within a corresponding second cone of accurate emission 28. Preferably, the second group of emitters 24, 25, 26 will be the same type of emitters as the first group of emitters 14, 15, 16 and the second cones 28 will have the same angle α with the second direction $F_{D2}$ as the first cones 18 have with the first direction $F_{D1}$.

Because the first face 10 and the second face 20 are both on the first side 51 of the tracking device 4, the field of view of the first side 51 of the tracking device 4 will be greater than the field of view if the tracking device 4 only had one face 10 or 20. This is the case because the optical tracking system 2 can track the position and orientation of the object 6 by tracking either the first group of emitters 14, 15, 16 on the first face 10 or the second group of emitters 24, 25, 26 on the second face 20. Because the emitters that comprise the first face 10, and the second face 20 are widely spaced, the accuracy of both faces 10 and 20 will be uniform in that there will be no transition from a widely spaced set of emitters to a closely spaced set.

The second direction $F_{D2}$ should be different from the first direction $F_{D1}$ so that the first group of emitters 14, 15, 16 on the first face 10 do not merely emit radiation in the same direction as the second group of emitters 24, 25, 26 on the second face 20. More preferably, the first direction $F_{D1}$ and the second direction $F_{D2}$ are selected such that the cone of accurate emission 18 of each of the first group of emitters 14, 15, 16 on the first face 10 combine with the cone of accurate emission 28 of each of the second group of emitters 24, 25, 26 on the second face 20 to increase or maximize the field of view of the first side 51 of the tracking device 4.

It is also preferable that the first direction $F_{D1}$ and the second direction $F_{D2}$ are selected such that the cone of accurate emission 18 of each emitter 14, 15, 16 on the first face 10 overlaps with a portion of the cone of accurate emission 28 of a corresponding emitter in the second group of emitters 24, 25, 26 on the second face 20. This overlapping is preferred to give the computer 7 the ability to select which of the emitters, namely the first group of emitters 14, 15, 16 or the second group of emitters 24, 25, 26, to track. The computer 7 will select the group of emitters, either 14, 15, 16 or 24, 25, 26, which can be best tracked. Generally, this redundancy increases the field of view of the tracking device 4 and the accuracy of the optical tracking system 2.

Also, the optical tracking system 2 can overcome the problem of coalescing at extreme angles using the tracking device 4. For example, if the optical tracking system 2 is tracking the first group of emitters 14, 15, 16 and two of them begin to coalesce, the optical tracking system 2 can select the second group of emitters 24, 25, 26. Because the second group of emitters 24, 25, 26 emit radiation in the second direction $F_{D2}$, which is different from the first direction $F_{D1}$, the second group of emitters 24, 25, 26 may not be coalescing and may be accurately tracked by the optical tracking system 2.

In a preferred embodiment, the emitters 14, 15, 16, 24, 25, 26 emit radiation in response to control signals $C_S$. If the cameras 8, 9 fall within the cone of accurate emission 18 of each of the emitters 14, 15, 16 in the first group, then the optical tracking system 2 will track the tracking device 4 using the first group of emitters 14, 15, 16. If the cameras 8, 9 fall within the cone of accurate emission 28 of each of emitters 24, 25, 26 then the optical tracking system 2 will track the tracking device 4 using the second group of emitters 24, 25, 26. The optical tracking system 2 can track the position and orientation of tracking device 4 from either the first group of emitters 14, 15, 16 or the second group of emitters 24, 25, 26, or some combination thereof. Only rarely will the situation arise where the optical tracking system 2 can accurately track both groups of emitters 14, 15, 16 and 24, 25, 26 simultaneously so that a combination of emitters 14, 15, 16, 24, 25, 26 of both groups is used to determine the position and orientation of the tracking device 4. In general, the cameras 8, 9 will accurately see the first group of emitters 14, 15, 16 or the second group of emitters 24, 25, 26. In this case, the computer system 7 will determine which emitters are most visible and accurate and which will be tracked, ignoring those that are inaccurate.

Preferably, each of the emitters 14, 15, 16 of the first group are separated from each other by at least a predetermined distance. This predetermined distance is ideally as large as practically possible to maximise accuracy and avoid coalescence. The minimum separation required will be a property of the separation between cameras, the camera technology used in the optical tracking system 2 and the distance from the tracking device 4 to the cameras 8, 9. For the same reasons, each of the emitters 24, 25, 26 of the second group are also preferably separated from each other by at least this predetermined distance.

Figure 5:
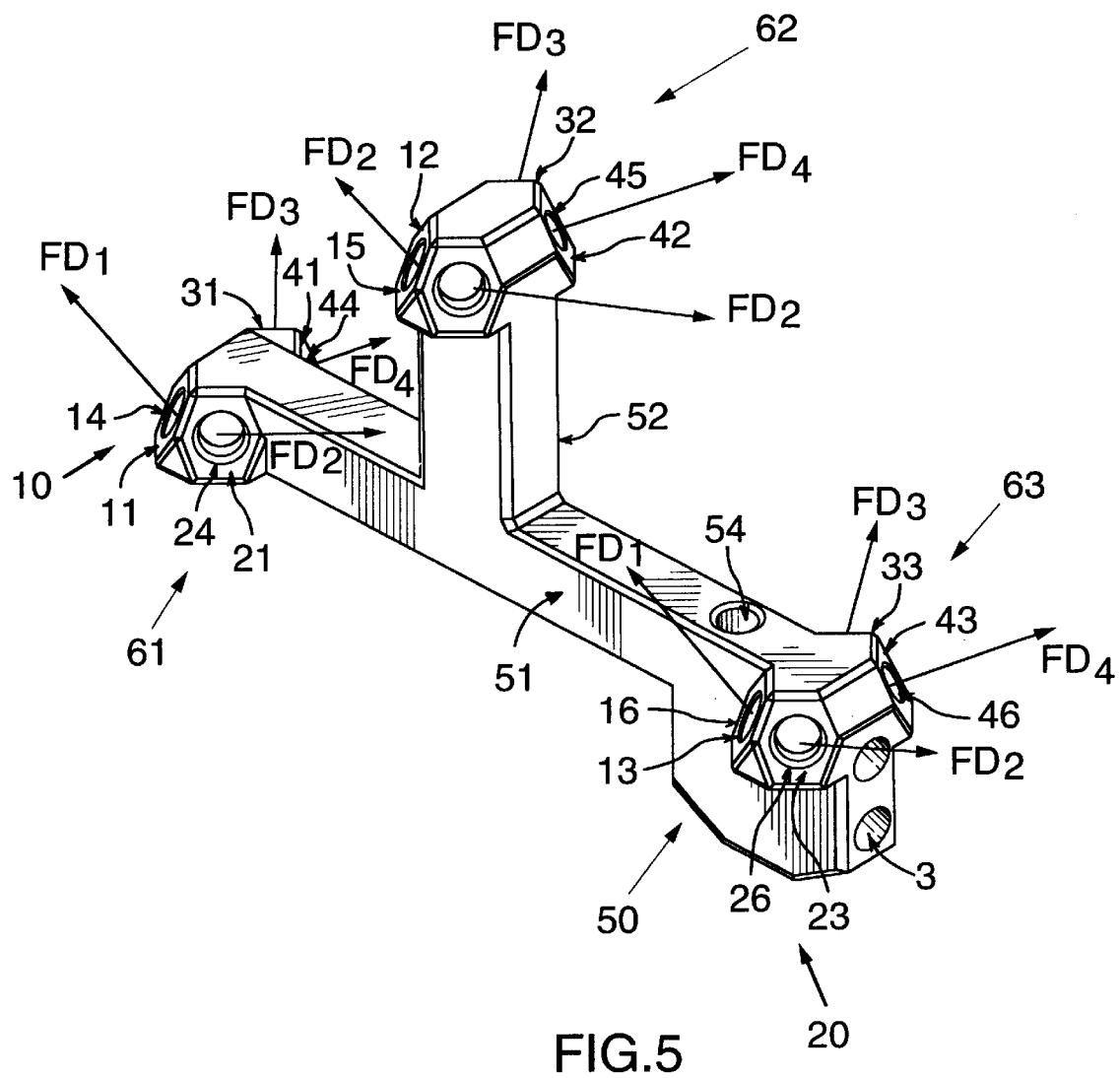
FIG. 5 shows an isometric view of the tracking device according to one embodiment of the present invention.

Because the first group of emitters 14, 15, 16 and the second group of emitters 24, 25, 26 are separated from each other, the first face 10 and the second face 20 need not be a continuous surface. Rather, as shown in FIGS. 2 and 5, the first face 10 can comprise at least three face portions 11, 12, 13. Each emitter 14, 15, 16 in the first group is located on a corresponding portion 11, 12, 13 of the first face 10. Likewise, the second face 20 need not be a continuous surface but could comprise at least three face portions 21, 22, 23. Each emitter 24, 25, 26 in the second group is located on a corresponding portion 21, 22, 23 of the second face 20.

In order to minimize the size of the tracking device 4, it is preferable that each emitter 14, 15, 16 of the first group is adjacent a corresponding emitter 24, 25, 26 of the second group. This provides a compact tracking device 4. As seen in FIG. 2, this arrangement results in each face portion 11, 12, 13 of the first face 10 being adjacent a corresponding face portion 21, 22, 23 of the second face 20. Face portions 11, 12, 13 of the first face 10 and the corresponding portions 21, 22, 23 of the second face 20 preferably form pyramid shaped structures, as shown in FIG. 5.

In addition, the first group of emitters 14, 15, 16 and the second group of emitters 24, 25, 26 are arranged on the housing 50 in at least three clusters 61, 62, 63. Each cluster 61, 62, 63 comprises at least one emitter from each of the first group of emitters 14, 15, 16 and the second group of emitters 24, 25, 26. As also seen from FIG. 2, the first direction $F_{D1}$ and the second direction $F_{D2}$, respectively, are selected such that the cones of accurate emission 18 and 28 give the optical tracking system 2 a field of view approximating a section of the sphere 72 centered at the corresponding cluster 62. While not shown in the Figures, the emitters 14, 24 on the first cluster 61 and emitters 16, 26 on the third cluster 63 also give the optical tracking system 2 a field of view of clusters 61, 63 approximating a section of a sphere centered at the corresponding clusters 61, 63.

Also, the position of the clusters 61, 62, 63 on the housing 50 are arranged to provide a maximum field of view for the optical tracking system 2. In the embodiment shown in FIG. 2, the housing 50 is arranged as a T-shaped housing with clusters 61, 62, 63 at the ends of the arms of the "T". Other housing designs include an L-shaped housing or a triangular housing, or any other type of housing where the clusters 61, 62, 63 are separated at least by the predetermined distance and the cones of accurate emission 18 and 28 combine to give the clusters 61, 62, 63 a field of view approximating a sphere.

Figure 3:
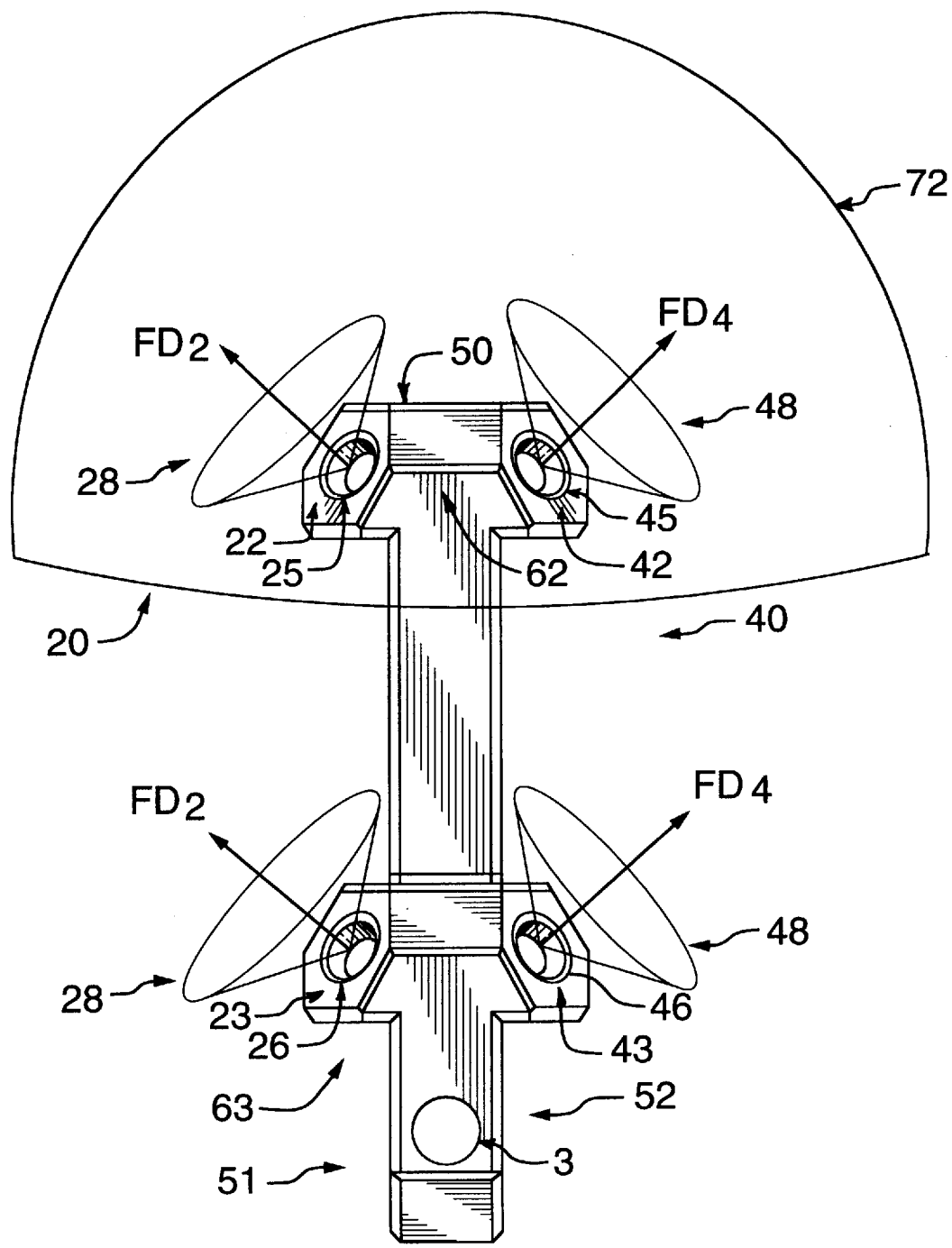
FIG. 3 shows a front view of the tracking device according to one embodiment of the present invention.
Figure 4:
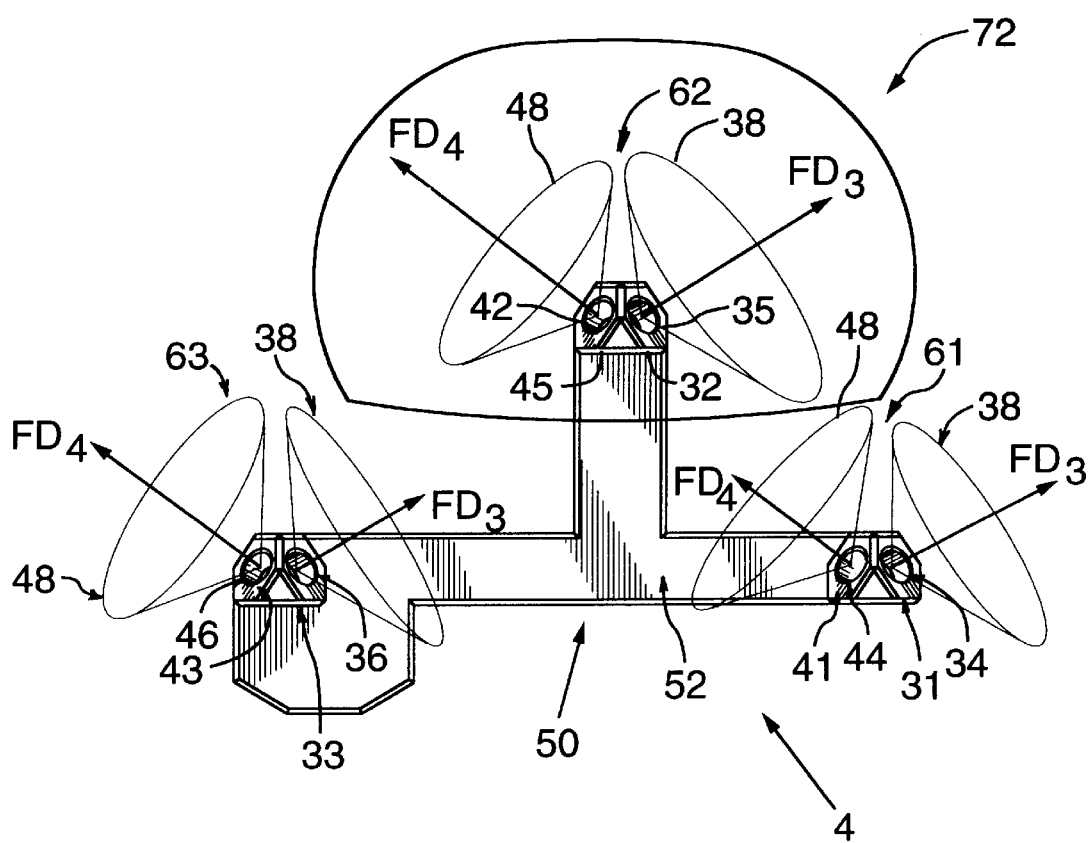
FIG. 4 shows a view of a second side of the tracking device according to one embodiment of the present invention.

As can be seen from FIGS. 3, 4 and 5, the tracking device 4, in a preferred embodiment, comprises a third face 30 and fourth face 40. The third face 30 and the fourth face 40 are on the second side 52 of the tracking device 4. The third face 30 and the fourth face 40, in a preferred embodiment, are substantially identical to the first face 10 and the second face 20 such that the tracking device 4 is symmetrical about its longitudinal axis. In other words, the third face 30 and the fourth face 40 comprise at least three face portions 31, 32, 33 and 41, 42, 43, respectively.

Each face portion 31, 32, 33, 41, 42, 43 has a corresponding emitter 34, 35, 36, 44, 45, 46, respectively. Each portion 31, 32, 33 of the third face 30 comprises an emitter 34, 35, 36 operable to emit radiation in a third direction $F_{D3}$. Each portion 41, 42, 43 of the fourth face 40 comprises an emitter 44, 45, 46 operable to emit radiation in a fourth direction $F_{D4}$. Also, each emitter on the third face 30 emits radiation in a third cone of accurate emission 38 and each emitter on the fourth face 40 emits radiation in a fourth cone of accurate emission 48.

The third direction $F_{D3}$ and the fourth direction $F_{D4}$ are directed away from the second side 52, but are different from each other. The optical tracking system 2 can track the position and orientation of the object 6 by tracking any three emitters but preferably those comprising the first group, second group, third group or fourth group of emitters.

To minimize the size of the tracking device 4, preferably, each portion 31, 32, 33 of the third face 30 is adjacent a corresponding portion 41, 42, 43, respectively, of the fourth face 40 and a corresponding portion 11, 12, 13, respectively, of the first face 10. Likewise, each portion 41, 42, 43 of the fourth face 40 is also adjacent a corresponding portion 21, 22, 23, respectively, of the second face 20. This arrangement is seen at least from FIGS. 2, 3, 4 and 5.

As also shown in FIGS. 3, 4 and 5, preferably, at least one emitter from each of the first group, second group, third group and fourth group is arranged in the three clusters 61, 62, 63. In this way, each cluster 61, 62, 63 has a pyramid shape on each of the first side 51 and the second side 52 of the tracking device 4.

As shown in FIG. 3, the first direction $F_{D1}$, the second direction $F_{D2}$, the third direction $F_{D3}$ and the fourth direction $F_{D4}$ are selected such that, for each cluster 61, 62, 63, the cones of accurate emission 18, 28, 38, 48 of each emitter on the clusters 61, 62, 63 combine to give a field of view of each cluster 61, 62, 63 substantially similar to a section of a sphere, and preferably approximating a half sphere centered at each of the clusters 61, 62, 63. FIGS. 2, 3 and 4 show the field of view generally by reference numeral 72 for the second cluster 62. The field of view for the other clusters 61, 63 will be similar to the field of view 72 for the second cluster 62, but there will be some obstruction due to the housing 50.

The optical tracking system 2 can select the emitters 14, 15, 16, 24, 25, 26, 34, 35, 36, 44, 45, 46 of the tracking device 4 which the cameras 8, 9 have the best view in order to most accurately track the tracking device 4. Each of the emitters 14, 15, 16, 24, 25, 26, 34, 35, 36, 44, 45, 46 on the tracking device 4 can be individually activated. Because the optical tracking system 2 can select from several emitters on the tracking device 4, it is very likely that the cameras 8, 9 will fall within the cone of emission 18, 28, 38, 48 of emitters comprising one of the faces 10, 20, 30, 40 on the tracking device 4, thereby increasing he field of view of the tracking device 41 and maintaining its accuracy in that expanded field of view.

At initial start-up, the optical tracking system 2 can strobe each of the emitters 14, 15, 16, 24, 25, 26, 34, 35, 36, 44, 45, 46 to determine whether the cameras 8, 9 can best track the position and orientation of the tracking device 4 by the first group of emitters 14, 15, 16, the second group of emitters 24, 25, 26, the third group of emitters 34, 35, 36 or the fourth group of emitters 44, 45, 46 or some combination of emitters. The optical tracking system 2 will then use the most accurate emitters to determine the position and orientation of the tracking device 4. If the system should decide that at least three emitters are not visible or within their respective cones of accurate emission, the system will report the device as "missing", or will estimate the position as best it can and report an indication of the error involved.

Preferably, the tracking device 4 comprises a light emitting diode ("LED") 54 shown in FIG. 5. The LED 54 emits light in the visible spectrum and can be seen by the user of the tracking device 4. When the optical tracking system 2 can track the tracking device 4 by at least three emitters 14, 15, 16, 24, 25, 26, 34, 35, 36, 44, 45, 46, the optical tracking system 2 causes the LED 54 to be continually lit indicating to the user that the object 6 is being tracked. If the tracking device 4 cannot be tracked by the optical system 2, the LED 54 is not continually lit or is flashed to warn the user that the object 6 is not being tracked.

Figure 6:
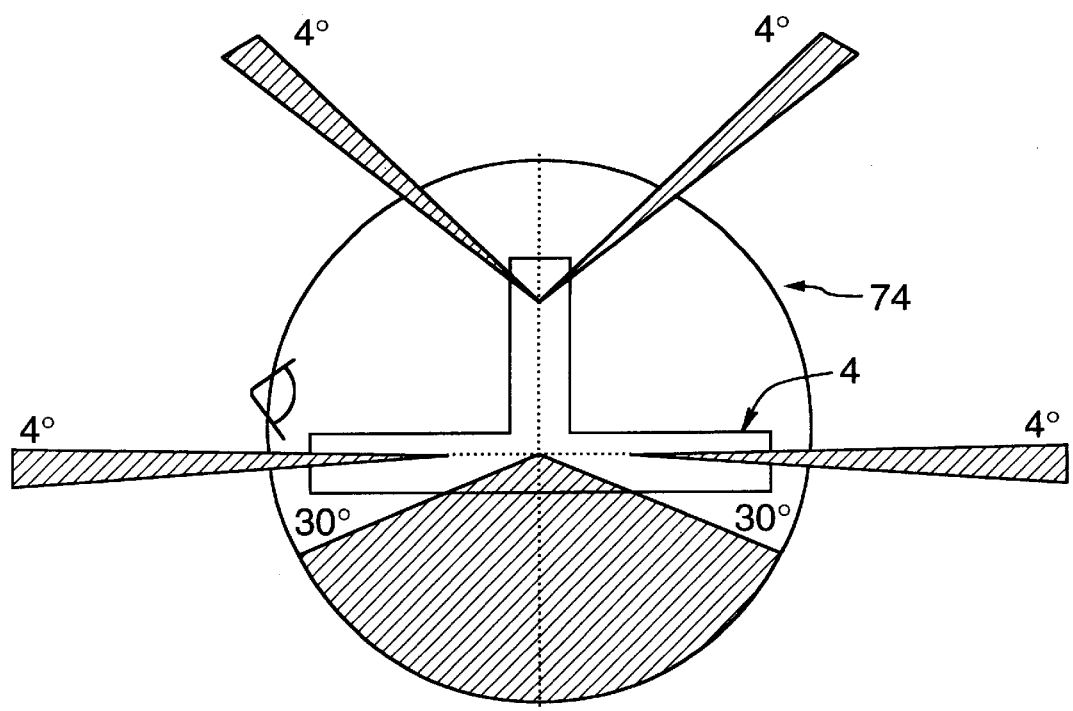
FIG. 6 shows a field of view of the tracking device according to one embodiment of the present invention from the side view.
Figure 7:
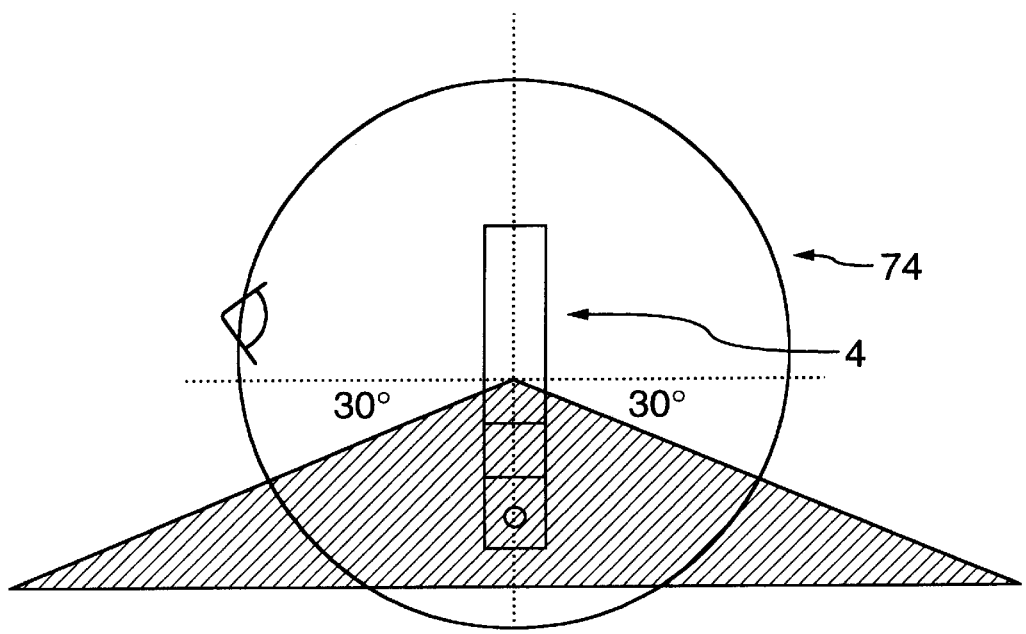
FIG. 7 shows a field of view of the tracking device according to one embodiment of the present invention from the front view.
Figure 8:
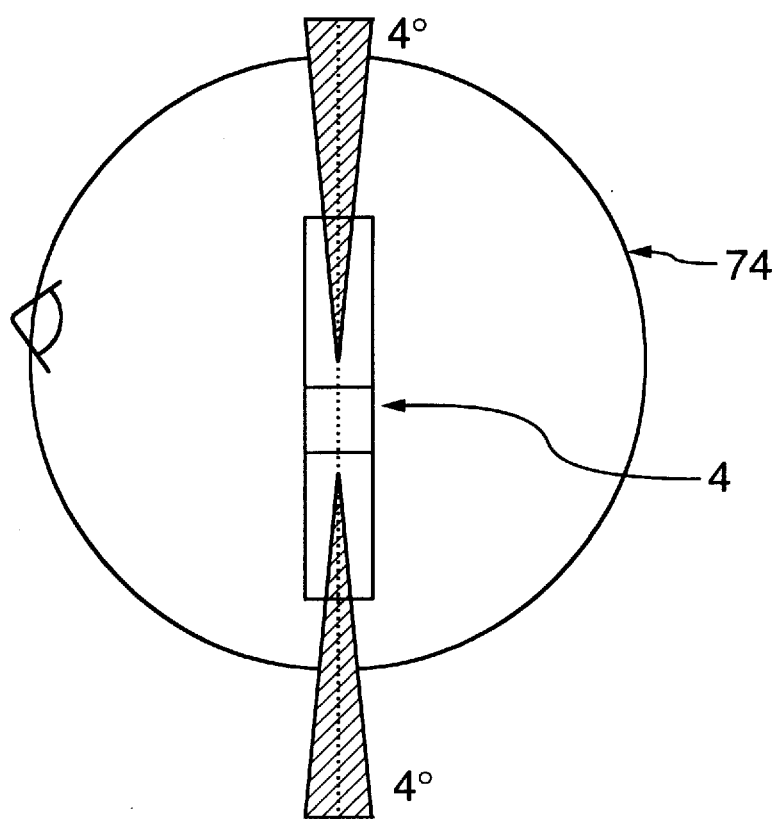
FIG. 8 shows a field of view of the tracking device according to one embodiment of the present invention from the top view.

FIGS. 6, 7 and 8 show the field of view 74 of the tracking device 4. FIG. 6 shows the field of view 74 from the side of the tracking device 4, FIG. 7 shows the field of view 74 from the front of the tracking device 4 and FIG. 8 shows the field of view 74 from the top of the tracking device 4. As can be seen from FIGS. 6, 7 and 8, the field of view 74 of the tracking device 4 is very large and approximates a section of a sphere. The largest "dead zone" where the cameras 8, 9 cannot view at least one of the four faces 10, 20, 30, 40 is located immediately below the tracking device 4. However, this is not problematic because this is where the object 6 would likely be located in relation to the tracking device 4, and therefore this area could not be viewed by the cameras 8, 9 in any event.

It is understood that the tracking device 4 is easily adaptable to track any type of object 6. The object 6 can be a surgical instrument, such as a probe or endoscope, or the arm of a robot in an industrial application. In either case, the mounting hole 3 can be used to rigidly fix the object 6 to the tracking device 4.

It is further understood that the emitters 14, 15, 16, 24, 25, 26, 34, 35, 36, 44, 45, 46 can be any type of emitters which emit radiation in a direction. Preferably, infrared emitting diodes (IREDs) are used.

It is understood that, while the tracking device 4 has been described in terms of having four faces 10, 20, 30, 40, the tracking device 4 could have a plurality of faces. Indeed, the greater the number of faces, the larger the field of view of the tracking device 4 because the probability that the optical tracking system 2 can find a face from the plurality of faces that can be accurately tracked increases. The number of faces 10, 20, 30, 40 required to give the tracking device 4 a large field of view is a function of the size of the cone of accurate emission of the emitters used.

It is understood that by arranging the emitters from each of the groups in clusters 61, 62, 63, the tracking device 4 will remain compact and maximize the field of view of each of the clusters 61, 62, 63. Likewise, while three clusters 61, 62, 63 are required, the tracking device 4 could comprise four or five or more clusters such as clusters 61, 62, 63. Each cluster 61, 62, 63 would have at least one emitter from each of the groups.

It is further understood that while the invention has been described in terms of a particular optical tracking system 2, the tracking device 4 can be used with any type of optical tracking system 2. In particular, the tracking device 4 can be used with an optical tracking system 2 having three or more 1-dimensional cameras, or, two or more 2-dimensional cameras.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, mechanical or electrical equivalents of the specific embodiments and features that have been described and illustrated herein.

The embodiments of the invention in which an exclusive property or privilege is claimed are defined as follows:

1. A tracking device for use in an optical tracking system to track a position and orientation of an object, said tracking device comprising:
    a tracker housing having a first side and a second side, and comprising means for rigidly fixing the device to the object;
    a first face on the first side of said device, said first face comprising a first group of at least three emitters, the first group of emitters operable to emit radiation substantially in a first direction directed away from the first side; and
    a second face on the first side of said device, said second face comprising a second group of at least three emitters, the second group of emitters operable to emit radiation in a second direction directed away from the first side; and
    wherein the second direction is different from the first direction.

2. The device as claimed in claim 1 wherein the tracking system can track the position and orientation of the object by tracking either the first group of emitters or the second group of emitters.

3. The device as claimed in claim 1 wherein the first group of emitters emit radiation in response to control signals from the optical tracking system and the second group of emitters emit radiation in response to the control signals from the optical tracking system, and the optical tracking system can track the position and orientation of the tracking device from the first group of emitters or the second group of emitters.

4. The device as claimed in claim 2 wherein each of the emitters of the first group of emitters emit radiation within a first cone of emission;
    wherein each of the emitters of the second group of emitters emit radiation within a second cone of emission;
    wherein the first direction and the second direction are selected such that the first cone of emission of each of the first group of emitters and the second cone of emission of each of the second group of emitters combine to provide a field of view of the first side which is greater than the first cones alone.

5. The device as claimed in claim 2 wherein each of the emitters of the first group emit radiation within a first cone of emission;
    wherein each of the emitters of the second group emit radiation within a second cone of emission;
    wherein the first direction and the second direction are selected such that the first cone of emission of each emitter in the first group of emitters overlaps a portion of the second cone of emission of a corresponding emitter in the second group of emitters.

6. The device as claimed in claim 4 wherein each of the emitters of the first group is separated from each of the other emitters in the first group by at least a predetermined distance, and each of the emitters of the second group are separated from each of the other emitters in the second group by at least the predetermined distance, said predetermined distance corresponding to a tolerance of the tracking system.

7. The device as claimed in claim 6 wherein each emitter of the first group is adjacent a corresponding emitter of the second group.

8. The device as claimed in claim 6 further comprising:
    a third face on the second side of said device, said third face comprising a third group of at least three emitters, the third group of emitters operable to emit radiation substantially in a third direction directed away from the second side; and
    a fourth face on the second side of said device, said fourth side comprising a fourth group of at least three emitters, the fourth group of emitters operable to emit radiation in a fourth direction directed away from the second side;
    wherein the third direction is different from the fourth direction; and
    wherein the tracking system can track the position and orientation of the object by tracking any one of the first group, second group, third group or fourth group of emitters.

9. The device as claimed in claim 8 wherein at least one emitter from each of the first group, second group, third group and fourth group of emitters is arranged in a cluster of emitters.

10. The device as claimed in claim 8 wherein the emitters from the first, second, third and fourth groups are arranged in at least three clusters of emitters, each cluster comprising one emitter from each of the first, second, third and fourth groups.

11. The device as claimed in claim 10 wherein each of the emitters of the third group emit radiation within a third cone of emission;

wherein each of the emitters of the fourth group emit radiation within a fourth cone of emission;

wherein the first direction, the second direction, the third direction and the fourth direction are selected such that for each cluster of emitters, the first cone of emission of the emitter of the first group, the second cone of emission of the emitter of the second group, the third cone of emission of the emitter of the third group and the fourth cone of emission of the emitter of the fourth group combine to give a field of view of each cluster on the device approximating a half sphere.

12. In an optical tracking system to track a position and orientation of an object, a tracking device comprising:

a tracker housing having a first side and a second side, and comprising means for rigidly fixing the device to the object;

a first face comprising at least three face portions;

a first group of at least three emitters, each emitter in the first group located on a corresponding portion of the first face, the first group of emitters operable to emit radiation substantially in a first direction directed away from the first side;

a second face comprising at least three face portions;

a second group of at least three emitters, each emitter in the second group located on a corresponding portion of the second face, the second group of emitters operable to emit radiation substantially in a second direction away from the first side and different from the first direction; and wherein each portion of the first face is adjacent a corresponding portion of the second face.

13. The device as claimed in claim 12 wherein the tracking system can track the position and orientation of the object by tracking either the first group of emitters or the second group of emitters.

14. The device as claimed in claim 13 wherein each of the emitters of the first group of emitters emit radiation within a first cone of emission;

wherein each of the emitters of the second group of emitters emit radiation within a second cone of emission;

wherein the first direction and the second direction are selected such that the first cone of emission of each of the first group of emitters and the second cone of emission of each of the second group of emitters combine to provide a field of view of the first side of the device which is greater than the first cones.

15. The device as claimed in claim 13 further comprising:

a third face comprising at least three face portions;

a third group of at least three emitters, each emitter in the third group located on a corresponding portion of the third face, the third group of emitters operable to emit radiation substantially in a third direction directed away from the second side;

a fourth face comprising at least three face portions;

a fourth group of at least three emitters, each emitter in the fourth group located on a corresponding portion of the fourth face, the fourth group of emitters operable to emit radiation substantially in a fourth direction away from the second side and different from the third direction; and wherein each portion of the third face is adjacent a corresponding portion of the fourth face and the first face.

16. The device as claimed in claim 15 wherein the emitters from the first, second, third and fourth groups are arranged in at least three clusters of emitters, each cluster comprising one emitter from each of the first, second, third and fourth groups and each of the clusters separated from each of the other clusters by at least a predetermined distance, said predetermined distance corresponding to a tolerance of the tracking system.

17. The device as claimed in claim 16 wherein each of the emitters emit radiation in a cone of emission; and wherein the first direction, the second direction, the third direction and the fourth direction are selected such that, for each cluster of emitters, the cone of emission of the emitters combine to provide a field of view substantially similar to a section of a sphere centered at the corresponding cluster.

18. In an optical tracking system to track a position and orientation of an object, a tracking device comprising:

a tracker housing comprising means for rigidly fixing the tracking device to the object;

at least two groups of emitters, each group of emitters having at least three emitters emitting radiation in the same direction, and, each group of emitters emitting radiation in different directions;

wherein the optical tracking system can track the position and orientation of the object by tracking any group of emitters; and wherein the emitters are arranged on the housing in at least three clusters, each cluster comprising one emitter from each of the groups.

19. The device as claimed in claim 18 wherein the direction of the groups of emitters are selected such that the optical tracking system has a field of view of each cluster approximating a half sphere centered at the corresponding cluster.

20. The device as claimed in claim 19 wherein there are at least three groups of emitters and each of the clusters are separated from each of the other clusters by at least a predetermined distance, said predetermined distance corresponding to a tolerance of the tracking system.

* * * * *